United States Patent [19]

Oberoi et al.

[11] Patent Number: 4,668,151

[45] Date of Patent: May 26, 1987

[54] TILE MANUFACTURING APPARATUS

[75] Inventors: Bhushan K. Oberoi, Horley; Terence J. Conroy, Lewes, both of England

[73] Assignee: Redland Roof Tiles Limited, Surrey, England

[21] Appl. No.: 751,983

[22] Filed: Jul. 5, 1985

[30] Foreign Application Priority Data

Jul. 6, 1984 [GB] United Kingdom ................ 8417248

[51] Int. Cl.$^4$ .............................................. B65G 1/00
[52] U.S. Cl. ................................... 414/331; 414/277; 414/280; 198/465.3
[58] Field of Search ............... 414/268, 277, 279, 280, 414/278, 331, 396; 198/465.3

[56] References Cited

U.S. PATENT DOCUMENTS

| | | | |
|---|---|---|---|
| 1,490,076 | 4/1924 | Luce | 414/331 |
| 1,606,477 | 11/1926 | McClelland | 414/331 |
| 2,718,972 | 9/1955 | Temple | 414/396 |
| 3,993,189 | 11/1976 | Khoylian et al. | 198/465.3 |
| 4,405,277 | 9/1983 | Bükner et al. | 414/277 |

FOREIGN PATENT DOCUMENTS

| | | |
|---|---|---|
| 926778 | 4/1955 | Fed. Rep. of Germany . |
| 23162 | 10/1957 | German Democratic Rep. . |
| 841561 | 4/1984 | PCT Int'l. Appl. . |
| 932846 | 7/1963 | United Kingdom . |
| 990101 | 4/1965 | United Kingdom . |
| 1286804 | 8/1972 | United Kingdom . |
| 1286805 | 8/1972 | United Kingdom . |
| 1572340 | 7/1980 | United Kingdom . |

Primary Examiner—Lawrence J. Oresky
Attorney, Agent, or Firm—Beveridge, DeGrandi and Weilacher

[57] ABSTRACT

In a plant for making concrete roof tiles, the tiles are loaded on to racks and cured in a curing chamber. Apparatus for unloading the tiles on their pallets from shelves in the racks on to an outfeed conveyor comprises a descending conveyor means having pairs of supports, the spacing of the pairs of supports being equal to the spacing of the shelves. A pusher moves columns of tiles from the shelves on to the pairs of supports which engage the edges of the tiles. A cam moves the descending conveyor away from the rack and the conveyor then is activated to deposit the tiles on to an outfeed conveyor in spaced relationship.

6 Claims, 19 Drawing Figures

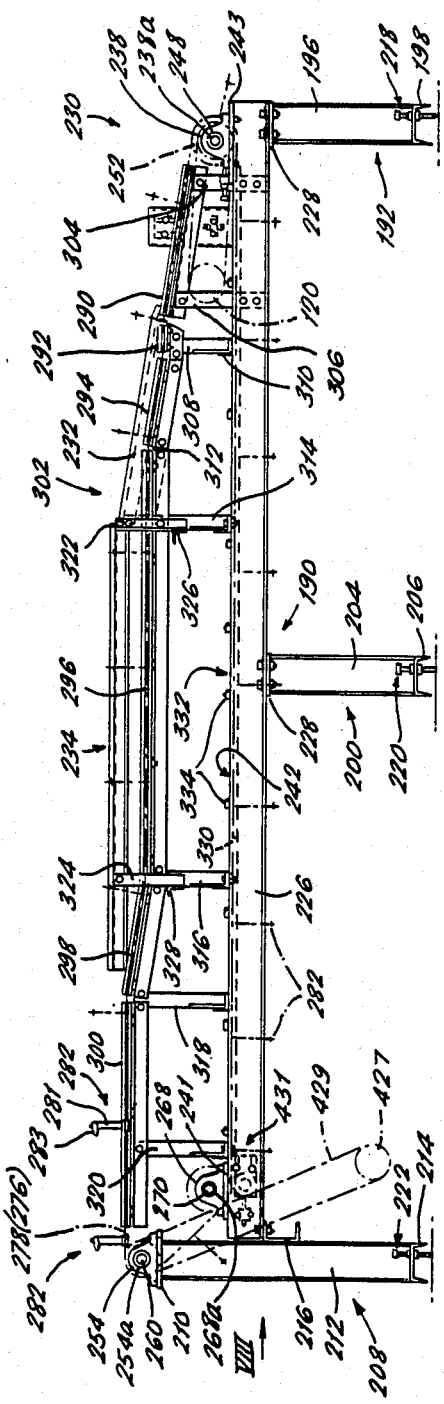
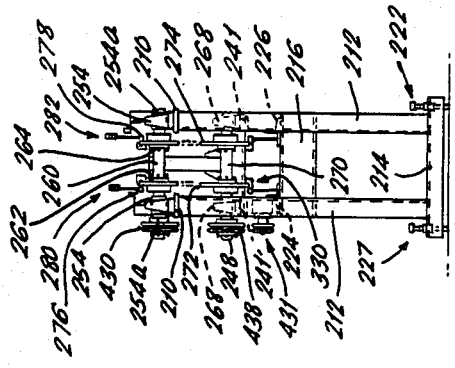
FIG. 7.
FIG. 8.

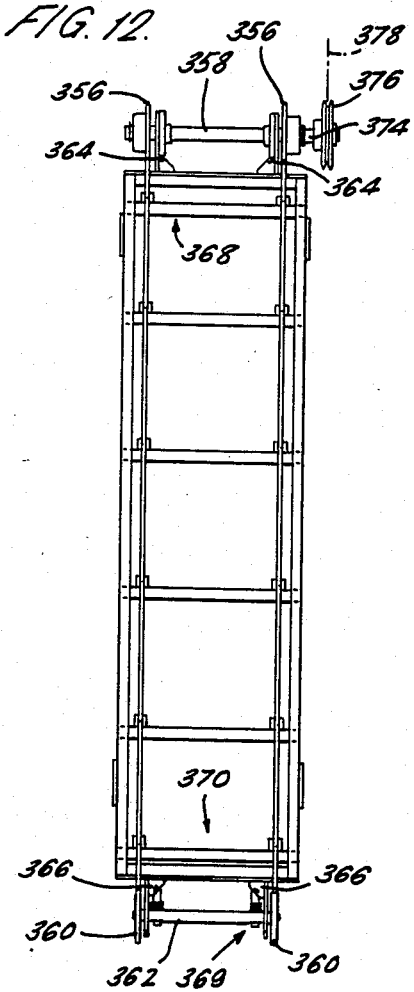
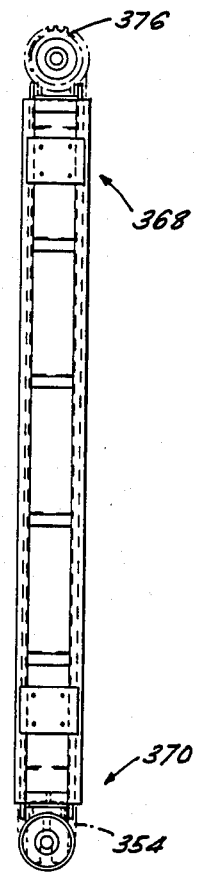
FIG. 12. FIG. 13.
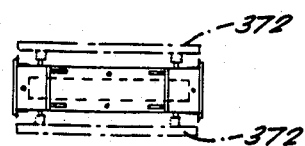
FIG. 14.

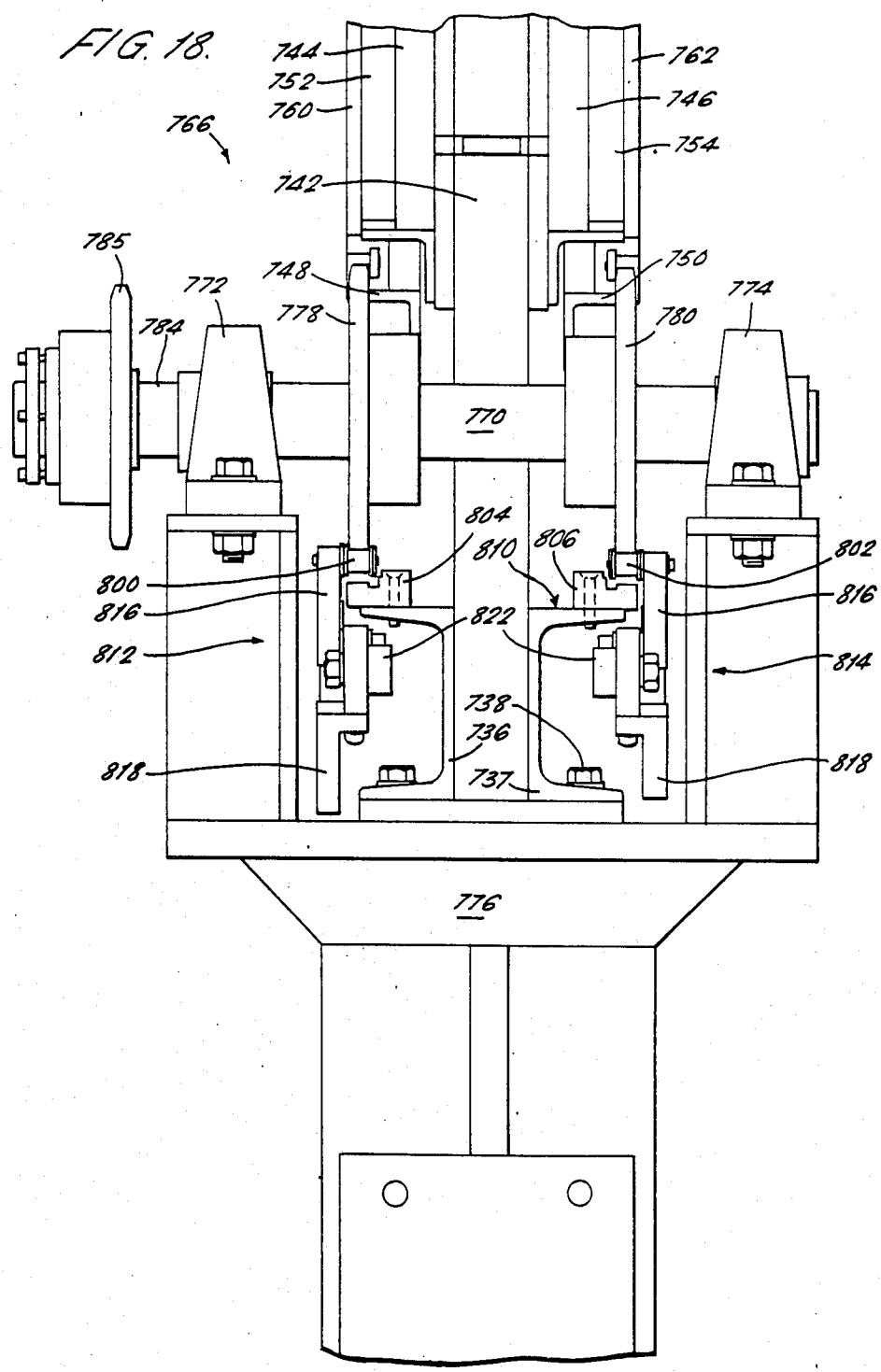

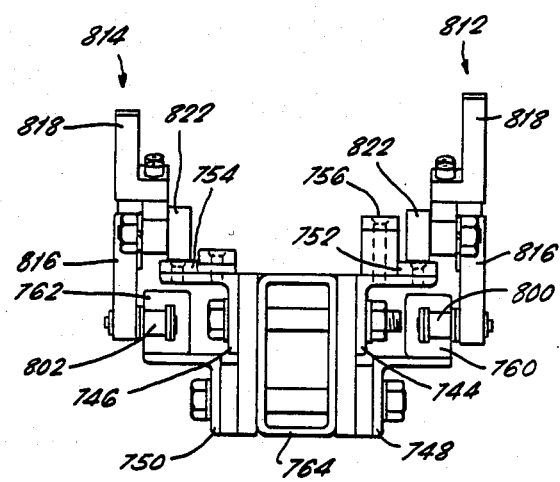

TILE MANUFACTURING APPARATUS

This invention is concerned with improvements in or relating to tile manufacturing apparatus particularly tile plant for the manufacture of concrete roof tiles.

It is well known that concrete roof tiles are generally produced by:

(a) feeding a series of metal pallets in end to end relationship through a tile making machine where concrete mortar is formed into a continuous ribbon on the upper surfaces of the pallets;

(b) severing the ribbon of mortar into discrete tile lengths on said pallets;

(c) passing the green-state tiles thus formed on the pallets, via a crowding conveyor and a racking assembly, to racks;

(d) transferring racks of "green-state" tiles to a curing chamber concomitantly with the transfer of racks of cured tiles to a de-racking assembly;

(e) de-racking the cured tiles and feeding them to a depalleting device wnere the tiles are separated from their pallets;

(f) feeding the pallets in a return loop of a main conveyor to the tile making machine of the plant; and, (g) feeding the cured tiles to a collation and packaging assembly.

In their passage from the tile making machine to the racks via the crowding conveyor and the racking assembly, the "green-state" tiles may be subjected to shock loads due to the sudden stop-start conditions under which the plant is operated. In such circumstances, the "green-state" concrete roof tiles may suffer damage which, if it is obvious from visual inspection, will enable the tiles to be removed from the crowding conveyor before racking is effected.

In one racking-deracking assembly, (described in British Pat. No. 1286805), the arrangement is such that a rack of "cured" tiles on their respective pallets is temporarily disposed across the path of the crowding conveyor. A pusher associated with the crowding conveyor is operated intermittently to push a series (four) of pallets carrying "green-state" tiles into the rack, the pallets being located on shelves of the rack. As the pallets and "green-state" tiles are loaded into the rack they engage the pallets of "cured" tiles to push them out of the rack on a downstream side thereof.

As each shelf is loaded and unloaded as aforesaid, the racks are caused to be moved heightwise relative to the crowding conveyor to align successive shelves therewith.

It will be obvious that such operations, in order to maintain tile making speeds of up to 150 tiles per minute, must be conducted in such a way that the tiles are subjected to a series of shock loads when being racked and deracked because of the high peak speeds of the racks and crowding conveyor during their intermittent operation. In addition, because the "green-state" tiles are crowded together by the crowding conveyor and because leading edges of first tiles may contact the trailing edges of cured tiles in said racks, wnen the racking and deracking operation is effected, damage to the said leading and trailing edges of the tiles may occur.

It is often the case, however, that damage to "green-state" tiles only becomes evident after packaging and transportation to an end user. In such instances, hairline cracks caused by the shock loads result in corners breaking off tiles as they are handled or following a spell of inclement weather. This leads to a loss of goodwill between the end-user and the manufacturer.

A further disadvantage of the crowding conveyor arrangement described above is that the crowding conveyors have a tendency to jam because the impact of the pallets one on another may cause misaignment of the pallets.

It is an object of the present invention to provice tile manufacturing plants in which impacts between pallets are reduced.

The invention provides apparatus for unloading a plurality of building components or pallets from shelves in racks on to an outfeed conveyor means, the apparatus comprising a descending conveyor means having a plurality of pairs of supports thereon, the spaces between the pairs of supports being equal to the spaces between the shelves in the racks and each pair of supports being adapted to engage and support opposed edge portions of a pallet, pusher means for pushing a column of pallets and building components carried thereon from the shelves on to the support means, and means for continuously driving the descending conveyor means to lower the pairs of supports in timed relation to movement of the outfeed conveyor means thereby to transfer the column of pallets from the supports to the outfeed conveyor means in spaced relationship.

The apparatus may further comprise reciprocating means for moving the descending conveyor between a first position in which the supports abut the shelves in the racks and a second position in which the supports and shelves are spaced apart.

Preferably the descending conveyor means is mounted on a movable carriage and the reciprocating means comprises cam means. The reciprocating means may further comprise a piston and cylinder arrangement to assist the cam means.

Preferably the cam means is driven by a motor in timed relation to downward movement of the descending conveyor and the outfeed conveyor, the arrangement being such that the descending conveyor means is moved from said first to said second position before the descending conveyor means is driven to the lower supports.

In one embodiment the pusher means is movable from a rest position to a plurality of extended positions for pushing one of a plurality of columns of pallets from the shelves of a rack on to the supports.

Preferably the pusher means is movable to four extended positions, for pushing four columns of pallets sequentially on to the supports.

A preferred embodiment of a tile making plant incorporating the present invention will now be described, by way of example, with reference to the accompanying drawings in which.

Figure 2:
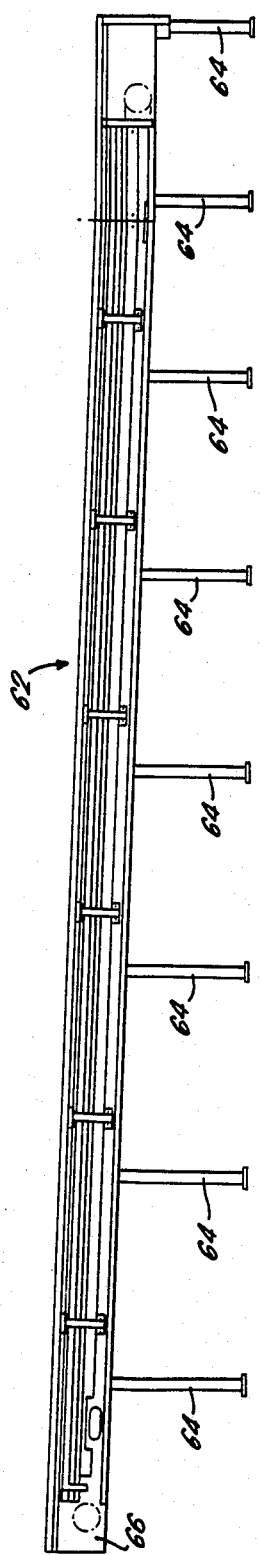
FIG. 2 is a side view of an outfeed conveyor of the tile forming station.
Figure 5:
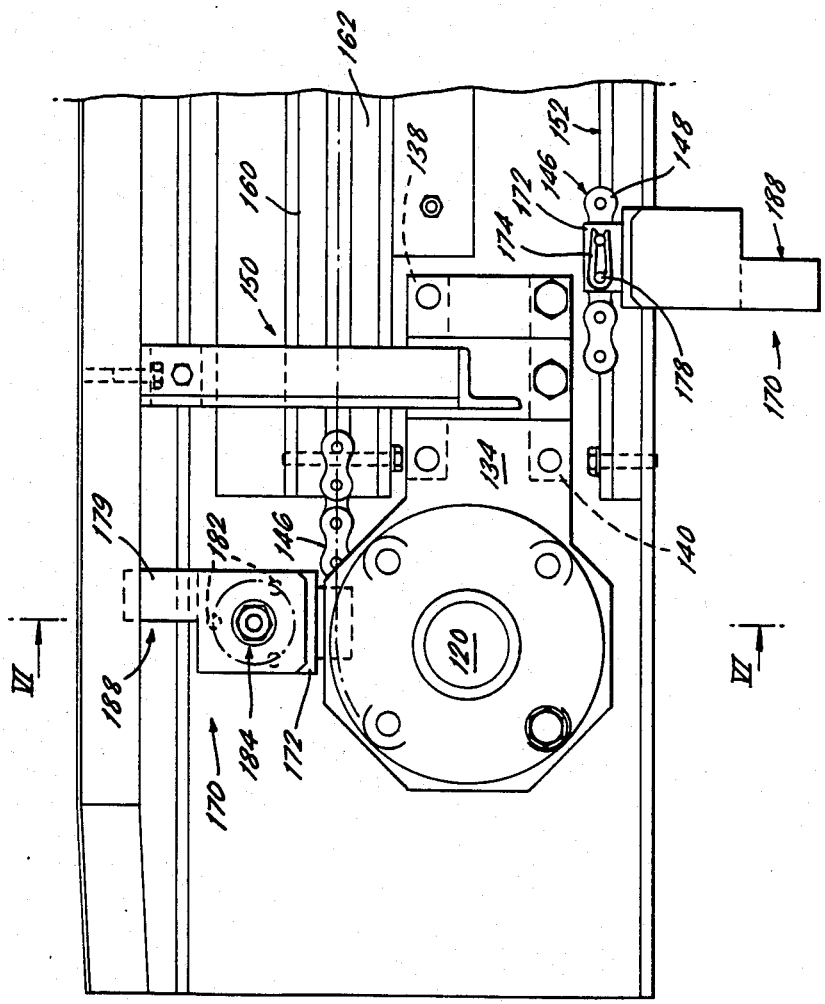
Figure 6:
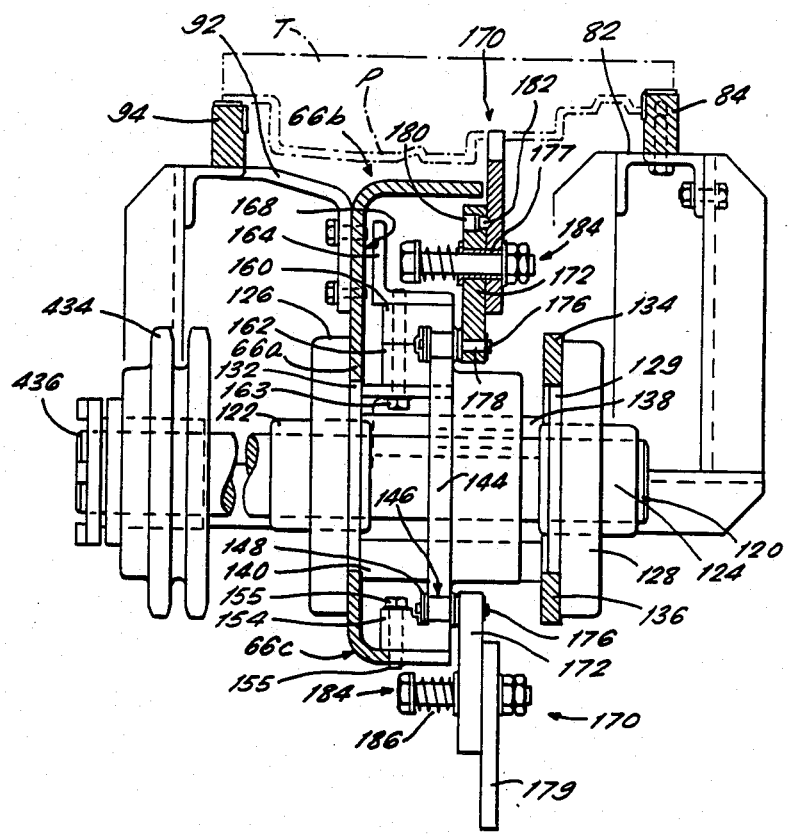
Figure 9:
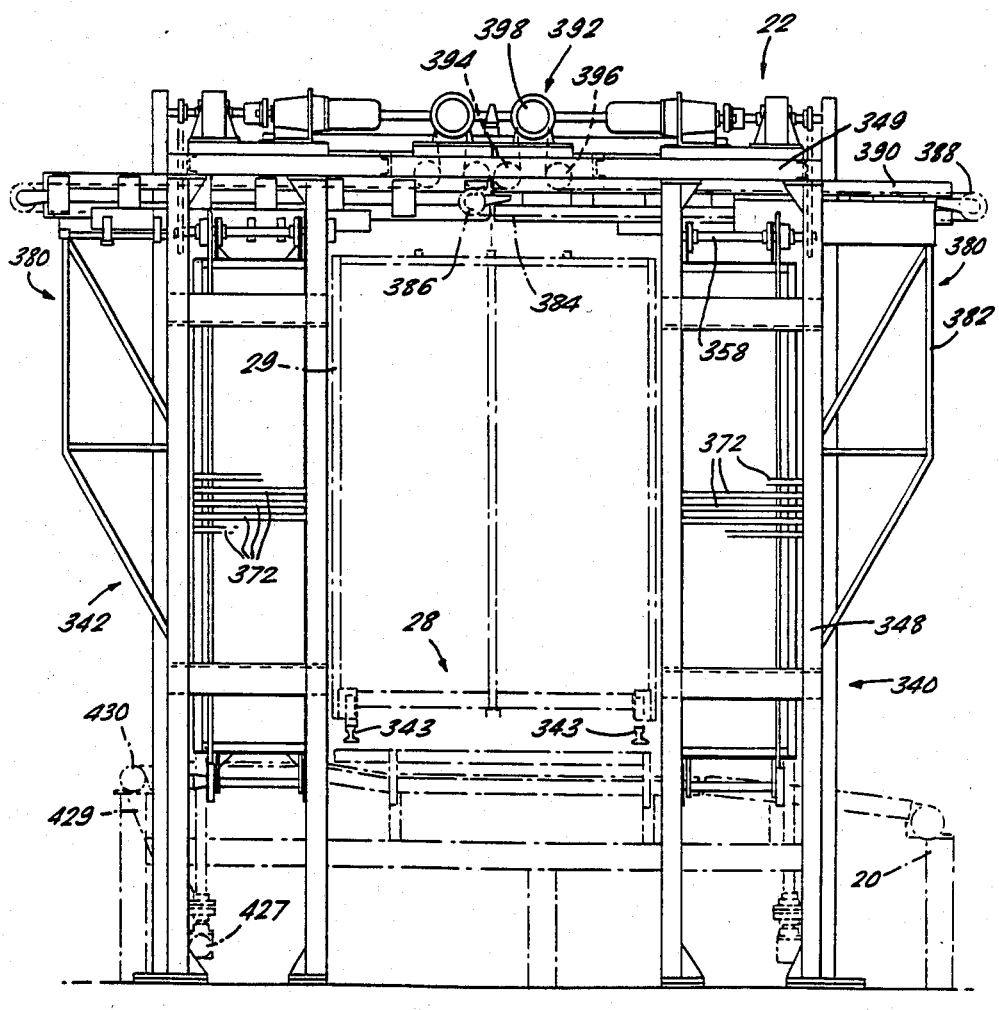
Figure 10:
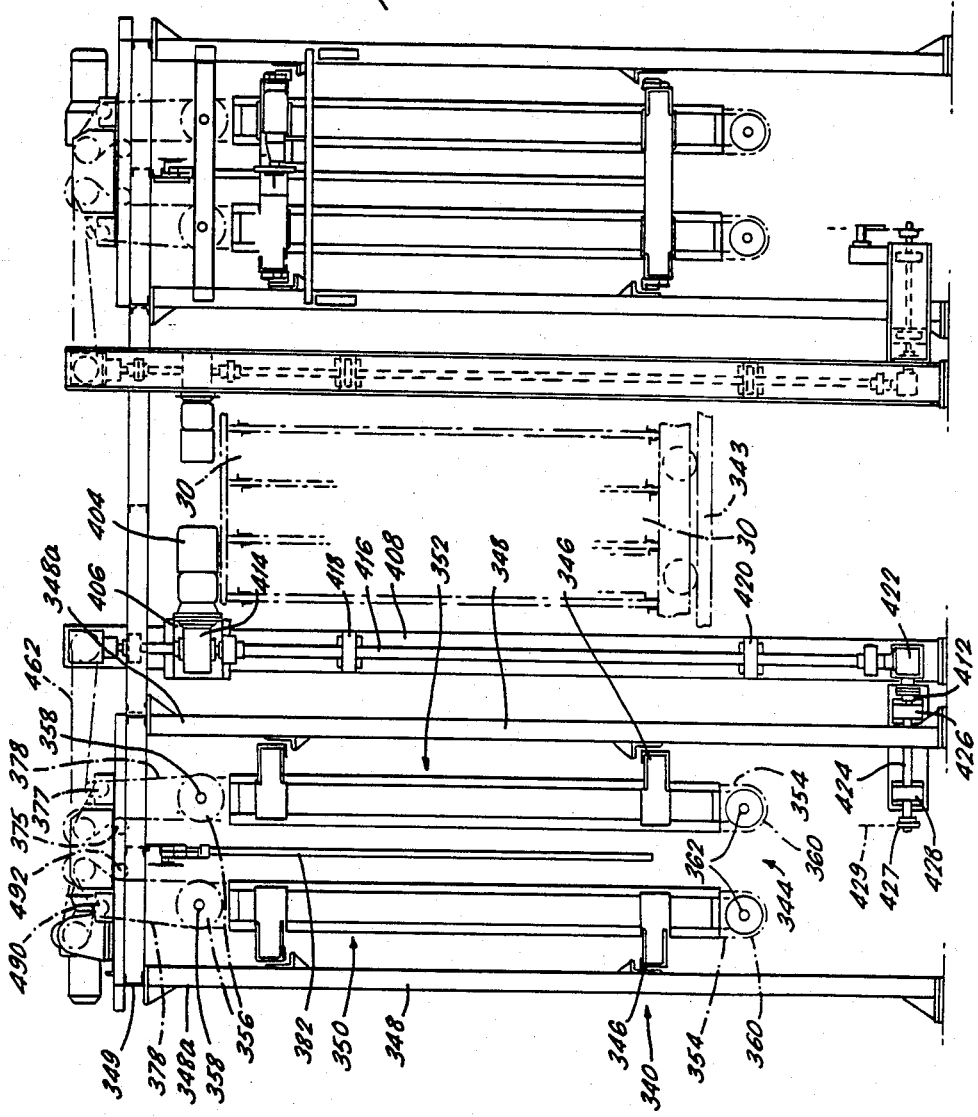
Figure 11:
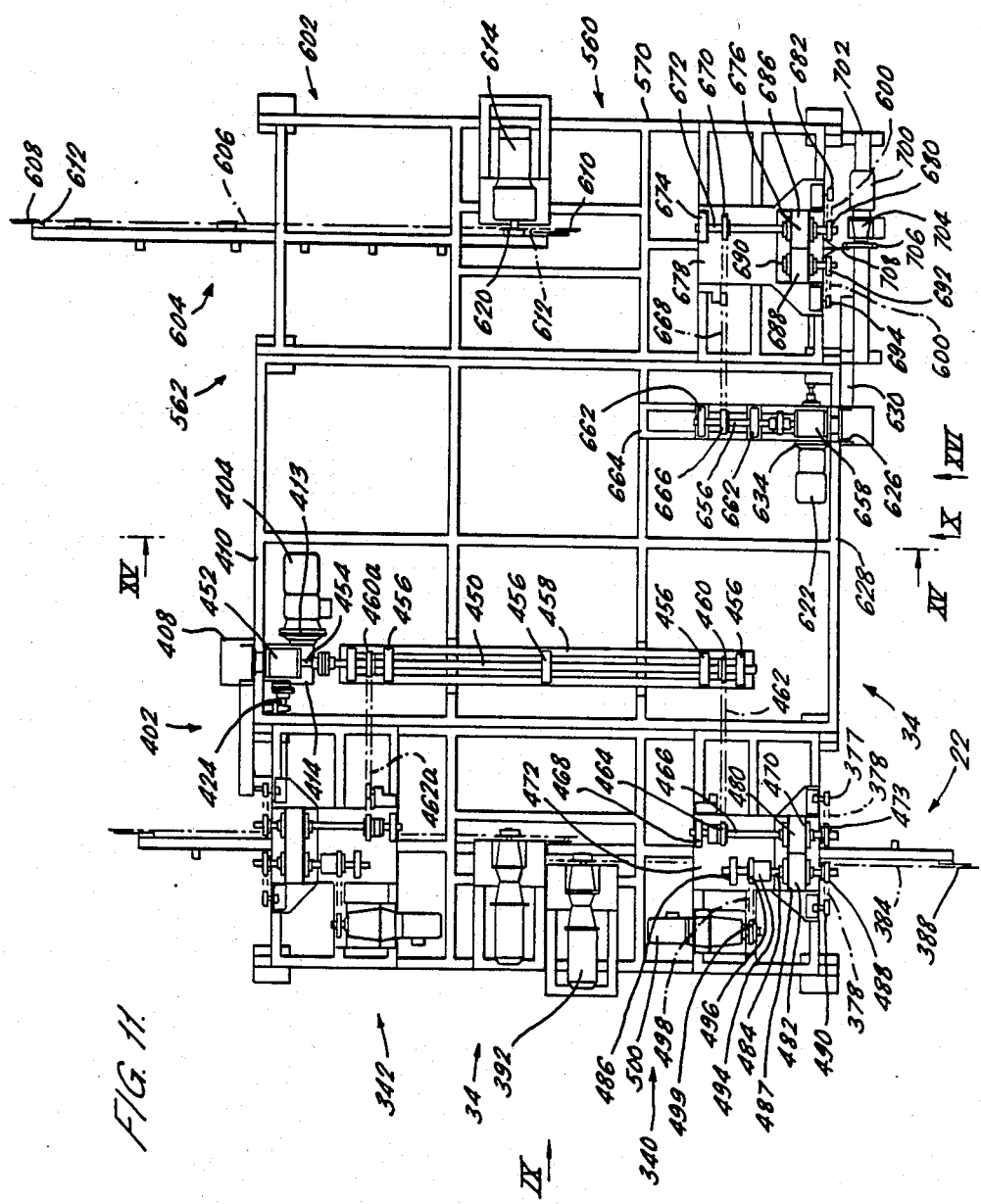
Figure 15:
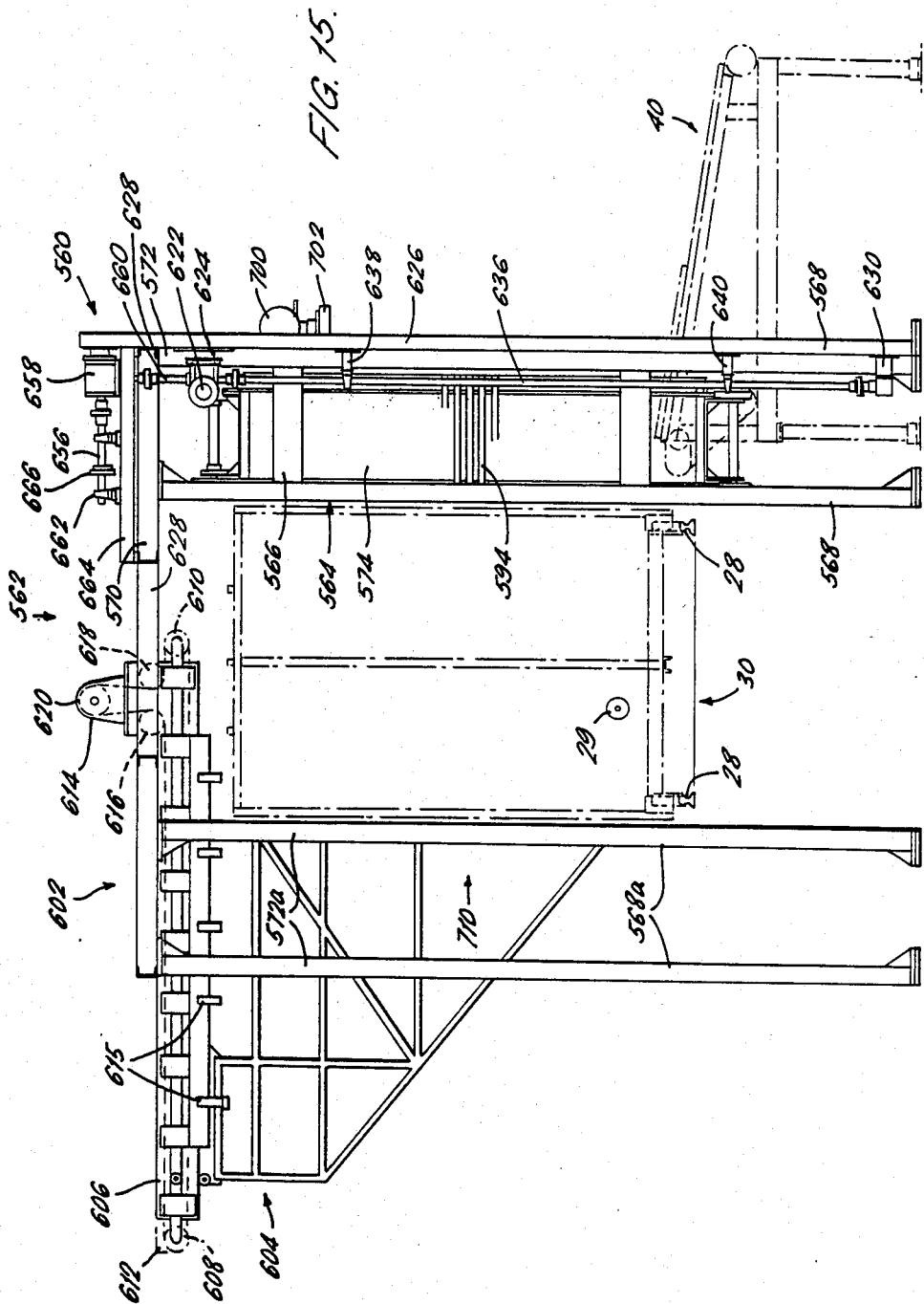
Figure 16:
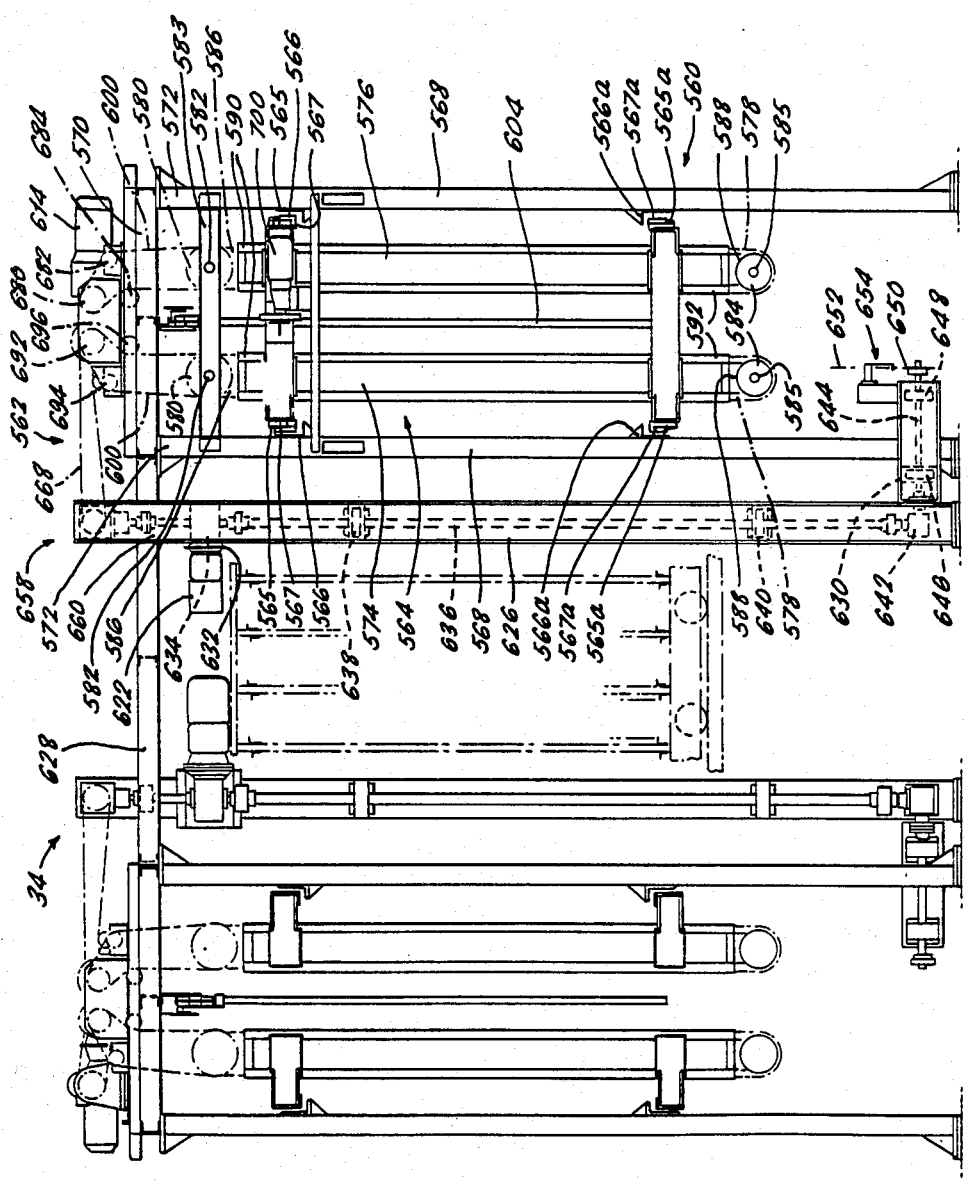
Figure 17:
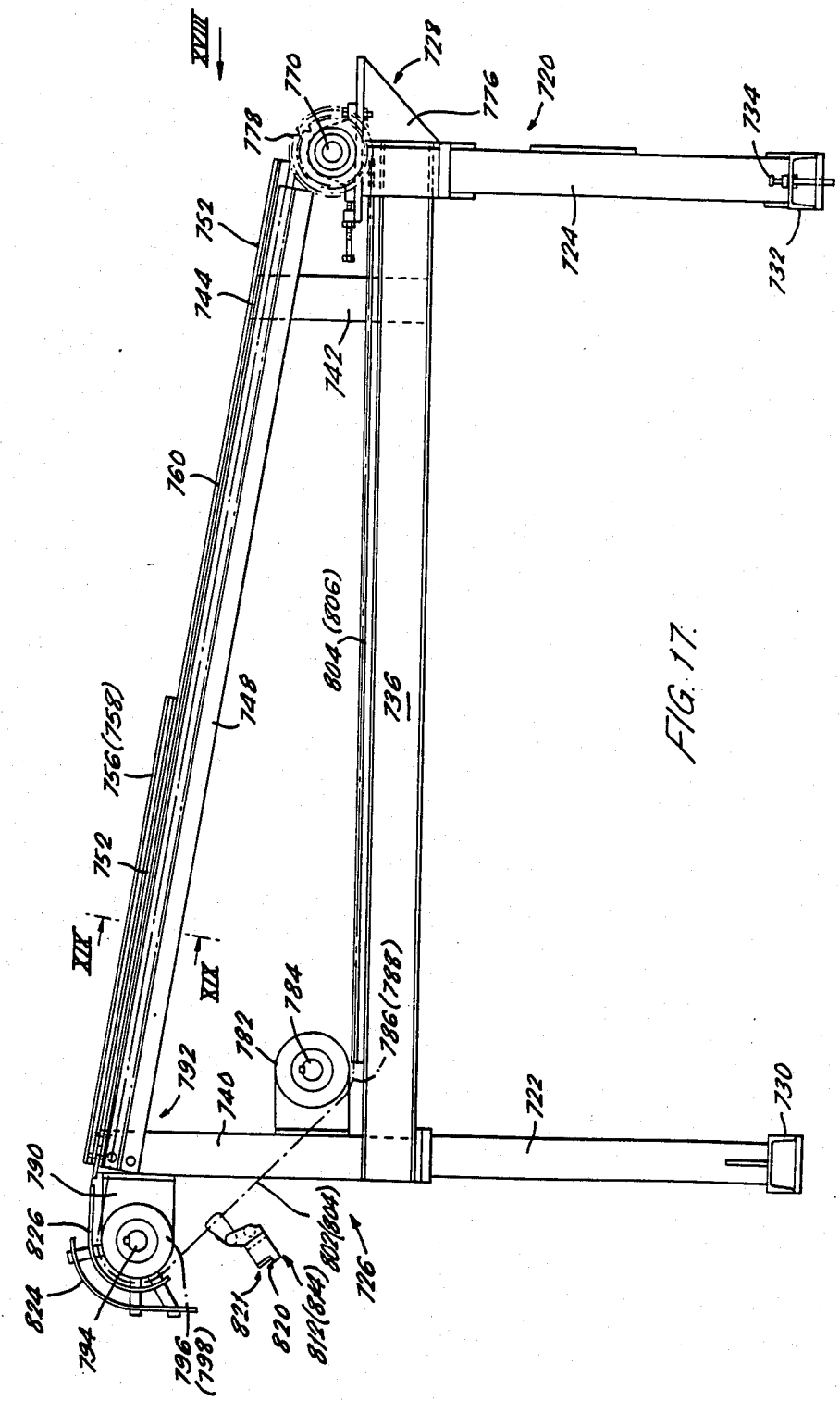

FIG. 5. is an enlarged view of a downstream left hand end of the outfeed conveyor shown in FIG. 2;

FIG. 6 is a section view taken on the line VI—VI of FIG. 5;

FIG. 7 is a side elevation of an infeed conveyor assembly for the racking assembly;

FIG. 8 is an end view of the infeed conveyor assembly in the direction of the arrow VIII in FIG. 7;

FIG. 9 is a side elevation of the racking assembly with the infeed conveyor assembly of FIG. 7 shown in chain-dot lines;

FIG. 10 is an end view of the racking assembly with some parts broken away for clarity;

FIG. 11 is a plan view of the racking and deracking assemblies with parts thereof omitted for clarity;

FIGS. 12, 13 and 14 are three views based on first angle projection of a magazine assembly used in the racking assembly;

FIG. 15 is a side section view of the deracking assembly along the line XV—XV of FIG. 11 with an outfeed conveyor for the deracking assembly shown in chain-dot line;

FIG. 16 is a front view of the racking and deracking assemblies in the direction of the arrow XVI in FIG. 11;

FIG. 17 is a detailed side view of the outfeed conveyor snown in chain-dot line in FIG. 15.

FIG. 18 is a view of a downstream end of the outfeed conveyor taken in the direction of the arrow XVIII of FIG. 17, and FIG. 19 is a section view of the line XIX—XIX of FIG. 17.

Concrete roofing tiles are generally manufactured in tile making plants in which metal pallets pass around a closed circuit loop. At an appropriate station within the tile making plant, concrete mortar is formed as a continuous ribbon on the pallets and then severed into individual lengths one on each pallet, the pallets and their "green-state" roofing tiles then being passed through a curing chamber and thereafter the cured tiles being removed from the pallets before the pallets pass around their closed circuit loop to the beginning of the tile making plant and the cured concrete roof tiles are removed from the plant for packaging and distribution.

Figure 1:
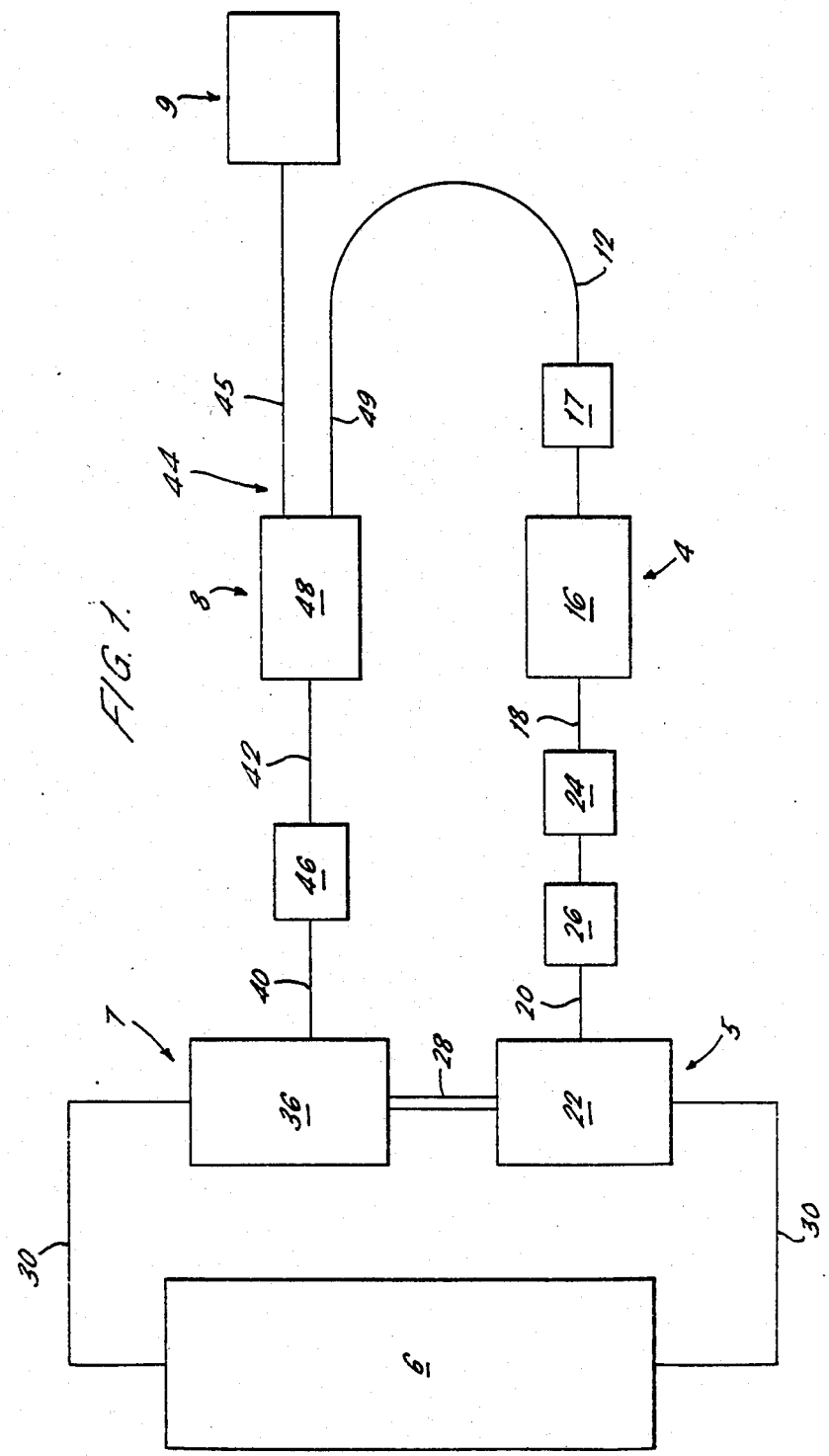
FIG. 1 is a block diagram of a tile making plant, showing the principle sections of the plant including a tile forming station, a racking assembly, a deracking assembly and a depalleting station.

Referring now to FIG. 1, there is illustrated a tile making plant of which the major components are a tile forming station 4, a racking station 5, a curing chamber 6, a deracking station 7, and a depalleting station 8. The tile forming station 4 comprises a tile making machine 16 of known type in which tile making machine concrete mortar is applied to metal pallets passing through the tile making machine and then cut into individual lengths to form an individual tile on each pallet. At the racking station 5, the pallets and their uncured tiles are stacked into racks which then pass through the curing chamber 6 to cure the tiles. At the deracking station 7, the pallets and the now cured tiles are unstacked and then passed to the depalleting station 8 at which the tiles are removed from the pallets.

As can be seen in FIG. 1 the essential components of the tile making plant described above are arranged in a closed loop so that the tile pallets may pass from one station to another in sequence. Rails 28 along which racks for the tiles linked by conveyor assemblies. A first run 12 of the conveyor assembly feeds into the tile making machine 16 and is operable to feed pallets through an oil box 17 to the tile making machine 16. The oil box 17 sprays the upper surfaces of the pallets with a release agent in known manner in order to reduce the risk of the tiles sticking to the pallets.

The tile making machine 16 includes an associated pallet feed arrangement (not shown in FIG. 1) which is similar to that disclosed in British Pat. No. 1274884 whereby the pallets P are fed through a mortar box and cutting station within the tile making machine. The mortar box is provided with a compacting roller and extrusion slipper of known type for compacting a ribbon of tile mortar on to the upper surface of the pallets P and the cutting station is provided with cutting means similar to that described in British Pat. No. 1352627 for cutting the ribbon of mortar into discrete tile lengths, one such length on each pallet.

At the downstream end of the tile making machine 16, there is an outfeed conveyor 18 which transfers the pallets and uncured tiles to an infeed conveyor 20 of the racking station 5. The infeed conveyor 20 feeds the pallets to a racking assembly 22 to be described in further detail below. As will also be described in further detail below, the outfeed conveyor 18 and infeed conveyor 20 transfer the pallets in a preset spaced relationship. At points along the outfeed conveyor 18, there are provided a slurry applicator 24 and a granule applicator 26 of known type which may be used to coat the uncured tiles with a slurry coating and/or a dressing of granules.

At the racking station 5, the pallets are stacked by the racking assembly into wheeled trolleys (not shown in FIG. 1) which travel along the rails 28. This process is described in further detail below. The trolleys containing stacks of uncured tiles are transferred from rails 28 and then passed along rails 30 in a generally rectangular path through the curing chamber 6. At the output end of the curing chamber 6, the trolleys 29 are transferred to and again travel along the rails 30 to the deracking station 7. It will be appreciated that, in known manner the length of the path of the trolleys through the curing chamber is designed to ensure that the uncured tiles remain in the curing chamber for an adequate time to completely cure the tiles.

The deracking station 7 includes a deracking assembly 36 which will be described in further detail below and the racking assembly 22 and deracking assembly 36 form two ends of a combined racking-deracking apparatus 34 which straddles the rails 28 along which the trolleys 29 pass. The deracking assemoly 36 removes the tiles from the trolleys and transfers them to an outfeed conveyor 40 which forms part of a second run of the conveyor assembly. As the pallets pass along the outfeed conveyor 40 they pass through a tile brushing station 46 wnere loose granules are removed from the upper surfaces of the cured tiles and thence to the depalleting station 8. The depalleting station comprises a depalleting device 48 of known type which separates the cured tiles from their respective pallets. The tiles then pass along a cord conveyor 45 to a collation and packaging station 9 which is effective to stacx the cured tiles and then packaging the stacks for onward distribution. The pallets P are transferred by the depalleting device 48 to a conveyor 19 and thence are returned by a suitable means to an upstream end of the conveyor 12, thus concluding a closed circuit loop for the pallets.

The racking and deracking assemblies, and their associated conveyors will now be described in more detail with reference to the remaining figures.

The Outfeed Conveyor of the Tile Making Machine

The outfeed conveyor 18, see particularly FIGS. 2 to 6, comprises a fabricated metal mainframe 62 of some 7.5 M length which provides an inclined path between the tile making machine 16 and the infeed conveyor 20 for the pallets P. The angle of the inclined path is approximately two degrees from the horizontal.

Figure 4:
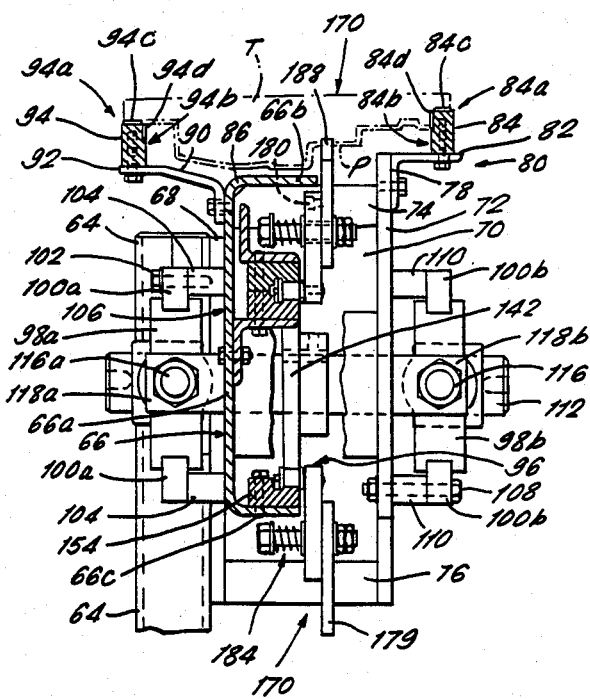
FIG. 4 is a section view taken on the line IV-IV of FIG. 3.

The mainframe 62 comprises eight floor mounted legs 64 interconnected by abridging member 66 see FIGS. 4 and 6. At their upper ends the legs 64 are each provided with a location pad 68, only one of which is shown in FIG. 4, and the bridging member 66 is secured to the pads 68 by welding.

The member 66 is generally "C" shaped in cross-section having a vertical wall 66a, an upper horizontal arm 66b and a lower horizontal arm 66c, which member 66 forms a side wall of an open box-like structure 70 comprising vertical pillars 72 and upper and lower horizontal tile members 74 and 76 respectively see FIGS. 2 to 6 and especially FIGS. 4 and 6.

Fixedly attached to upper end portions 78 of the pillars 72 is a series of brackets 80 of inverted "L" shape. Fixedly mounted on horizontal arms 82 of such brackets 80 is a right-hand slide member 84, see FIGS. 4 and 6.

Fixedly attached to upper end portions 86 of the bridging members vertical wall 66 is a series of brackets 90 of inverted "L" shape. Fixedly mounted on horizontal arms 92 of such brackets 90 is a left-hand slide member 94, see FIGS. 4 and 6.

The slide members 84 and 94, which are provided by bars of rectangular cross-section, extend the whole length of the outfeed conveyor 18.

The slide 84 comprises upper and inwardly facing surfaces 84a and 84b which are provided with friction pads 84c and 84d respectively, see FIGS. 4 and 6.

Similarly, the slide 94 comprises upper and inwardly facing surfaces 94a and 94b which are provided with friction pads 94c and 94d respectively, see FIGS. 4 and 6.

The pads are conveniently made from tungsten carbide although any material having similar properties may be used.

The slide 84 is arranged to lie in a plane slightly above that of the slide 94, as shown in FIGS. 4 and 6, thus, the slides 84 and 94 provide support for pallets P fed from the tile making machine 16 to the infeed conveyor 20, see ghost line representation of pallet P in FIGS. 4 and 6.

For conveying the pallet P and the "green-state" tiles carried thereby, the conveyor 20 comprises a chain drive 96 of conventional design. Associated with the chain drive 96 is a tensioning device 98 comprising slideblocks 98a and 98b slidably mounted between pairs of slideways 100a and 100b provided at an upstream end of the infeed conveyor 20, see FIGS. 3 and 4.

Figure 3:
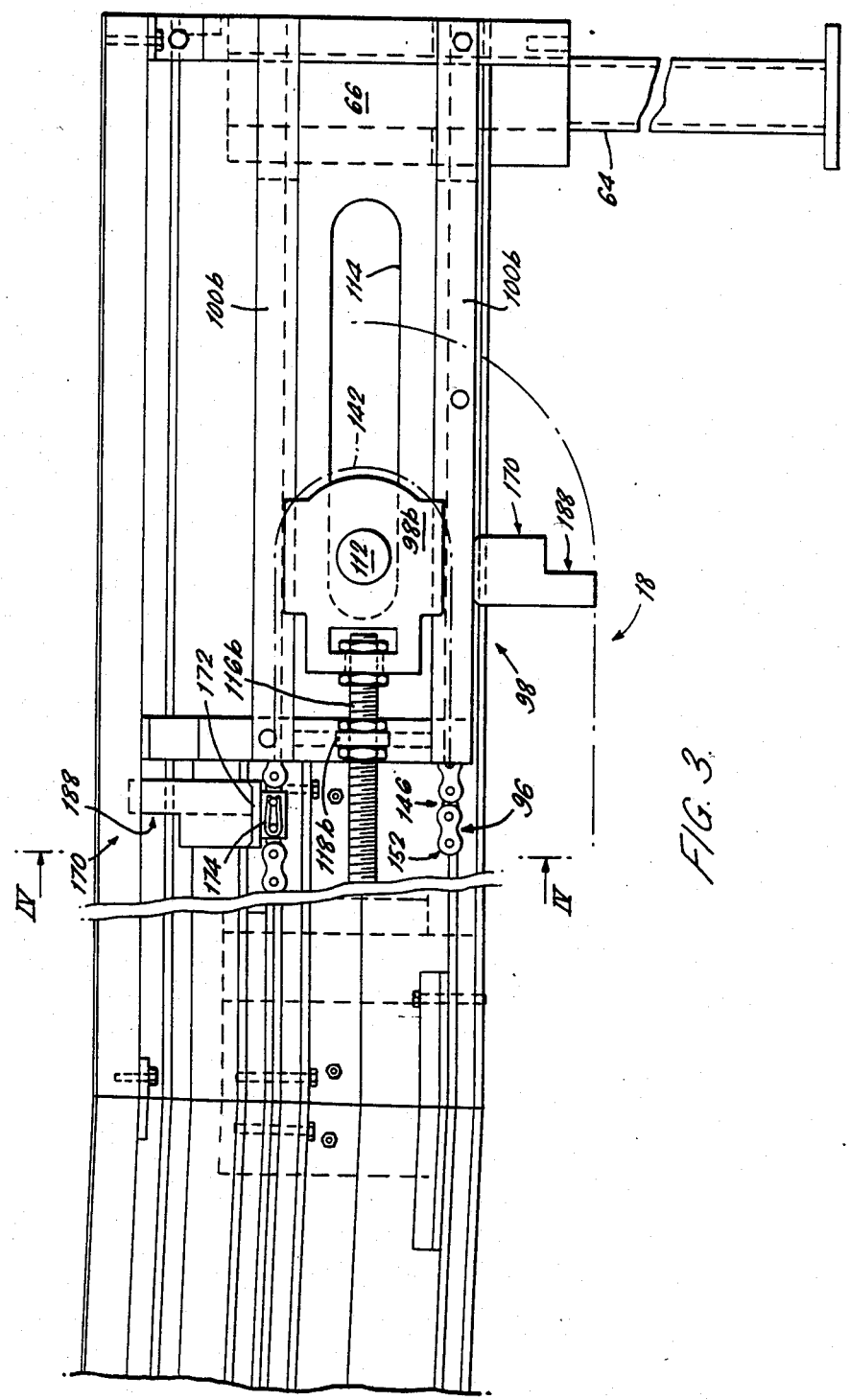
FIG. 3 is an enlarged view of an upstream right hand end of the outfeed conveyor shown in FIG. 2.

The slideways 100a are secured by bolts 102 to bosses 104 provided on an outwardly facing surface 106 of the bridging members vertical wall 66a and the slideways 100b are secured to two of the pillars 72 by nut and bolt assemblies 108, collars 110 being provided for spacing the slideways 100b from the pillars 72. The slideblocks 98a and 98b of the device 98 support a shaft 112 which extends through an elongate slot 114 in the vertical wall 66a of the members 66 as shown in FIGS. 3 and 4. Conventional tie bolts 116a and 116b are provided between the slideblocks 98a and 98b and fixed lugs 118a and 118b provided one on an upstream part of the surface 106 of the bridging members 66 vertical wall 66a and one on the next in line upstream pillar 72, see FIGS. 3 and 4.

At a downstream end of the conveyor 20, see especially FIGS. 5 and 6, the chain drive 96 comprises a shaft 120 rotatably mounted in bearings 122, 124 supported in bearing blocks 126 and 128 respectively, the block 126 being fixedly mounted on the member 66 with a boss portion 130 thereof being received in an appropriate bore 132 which extends through the vertical wall of the member 66. The block 128 is fixedly mounted on a support plate 134 with a boss 129 of the block being received in an appropriate bore 136 in said plate 134. The plate 134 is fixedly mounted on the member 66 but is spaced therefrom by spacer blocks 138 and 140.

Fixedly mounted on the shafts 112 and 120 substantially within the confines of the "C" shaped member 66, see especially FIGS. 4 and 6, are aligned sprockets 142 and 144 respectively. An endless chain 146 comprising links 148 passes over and is carried by the sprockets 142 and 144 to form upper and lower runs 150 and 152 thereof, see FIG. 5.

The member 66 provides support for the upper and lower runs of the endless chain 146, see FIGS. 4 and 6, the lower run 152 being supported on a strip 154 of frictionless plastics material which in turn is fixedly mounted by bolts 155 on the upper side of the lower wall 66c, see FIGS. 5 and 6.

The upper run 150 of the chain 146 is held captive between upper and lower strips 160 and 162 of frictionless plastics material secured together by bolts 163 between brackets 164 and 166 fixedly mounted on an inner surface 168 of the wall 66a, see FIGS. 5 and 6.

Carried by the chain 146 in spaced relationship are drive means 170 for engaging with appropriate lugs on the underside of the pallets P, see FIGS. 4, 5 and 6. The drive means 170 each comprise carrier plate 172 secured by clips 174 to extensions 176 of associated link pins 178. Pivotally mounted on a hollow spindle 177 carried by each carrier plate 172 is a spring loaded drive dog 179 which is normally retained in an operative condition, as shown in FIGS. 5 and 6, by engagement of three poppet elements 180 in appropriate recesses 182 provided in said drive dog 179. A nut and bolt assembly 184 and a compression spring 186 retain the plates 172 and dogs 179 in said operative condition whereby, when the conveyor 18 is in use and pallets P with "green-state" tiles T are issuing from the tile making machine 16, an underside abutment on each pallet P is engaged by a drive face 188 of an associated drive dog 179. Thus, the pallets P and green state tiles T carried thereby are conveyed seriatim in positive space relationship from the tile making machine 16 to the infeed conveyor 20. If for any reason the load on the drive dogs 179 exceeds the forces exerted by the springs 186, the dogs 179 will move clockwise about their pivot spindle 177 out of driving engagement with the underside abutments on each pallet thereby avoiding undue damage to the drive means 170.

The infeed Conveyor of the Racking Device

The infeed conveyor 20, see FIGS. 7 and 8, comprises a fabricated metal main frame 190 made up of "C" shaped elements bolted together and comprising (a) a right hand support 192 having two uprights 196, only one of which is shown in FIG. 7, the uprights 196 being joined at their base by a bridging member 198, (b) a central support 200 having two uprights 202 and 204, only one of which is shown in FIG. 7, the uprights being joined at their base by a bridging member 206, and (c) a left hand support 208 having two uprights 212 joined at their base and mid sections by bridging members 214 and 216 respectively.

The bridging members 198, 206 and 214 are provided with adjustment devices 218, 220 and 222 respectively for adjusting the trim of the mainframe 190.

The mainframe 190 also comprises two members 224 and 226 which are fixed to flange plates 228 provided on upper ends of the uprights 194, 196, 202 and 204, the left hand ends of the said members 224 and 226 being bolted to the bridging members 216.

The members 224 and 226 provide support for a chain drive means 230 and pallet slides 232 and 234 of the infeed conveyor as hereinafter described.

The drive means 230 comprises a pair of opposed bearing blocks 238 fixedly mounted at the upstream end of the infeed conveyor 20 on upper horizontal surfaces 242 of the members 224 and 226 with bearing pads 243 located therebetween.

The bearing blocks 238 and associated bearings 238a provide support for aligned stub shafts 248. Fixedly mounted on the shafts 248 are associated sprockets 250 and 252, see FIG. 7.

The drive means 230 also comprises a pair of opposed bearing blocks 254 fixedly mounted, at the downstream end of the infeed conveyor 20, on bearing pads 210 provided one on top of each upright 212, see FIG. 8. The blocks 254 are arranged in mutual alignment and are provided with associated bearings 254a adapted to receive and support a rotatable shaft 260.

Fixedly mounted on the shaft 260 are a pair of sprockets 262 and 264, see FIG. 8. The drive means 230 further comprises a pair of opposed bearing blocks 268 fixedly mounted, at the downstream end of the infeed conveyor 20, on bearing pads 241 provided one each on the walls 240 and 242 of the members 224 and 226.

The blocks 268 are arranged in mutual alignment and are provided with associated bearings 268a adapted to receive and support a rotatable shaft 270. Fixedly mounted on the shaft 270 are a pair of sprockets 272 and 274, see FIG. 8. The sprockets 250, 262 and 272 support and drive an endless chain 276 and the sprockets 252, 264 and 274 support and drive an endless chain 278, see FIGS. 7 and 8. The chains 276 and 278 provide support for pallet drive elements 280 and 282 respectively; the said elements, each of which is comprised as mutually aligned pairs thereby facilitating engagement with pallets P fed to an upstream end of the infeed conveyor 20 by the drive dogs 179 of the outfeed conveyor 18.

Between the upstream and downstream ends of the infeed conveyor 20 there are six successive pair of chain guides 290, 292, 294, 296, 298 and 300 only one of each being shown in FIG. 7, for guiding the chains 276 and 278 through an upper run 302 of the infeed conveyor 20 between the sprockets 250, 252 and 262, 264.

The guides 290, only one of which is shown in FIG. 7, are fixedly mounted on pillers 304 and 306 fixed to and extending upwardly from the members 224 and 226.

The guides 292, only one of which is shown in FIG. 7, are fixedly secured on outer wings of a "T" piece 308 secured to the members 224 and 226 by an angle bracket 310. The guides 294, only one of which is shown in FIG. 7, is secured to a bridging member 312 an upstream end of which is fixedly mounted on the "T" piece 308.

The guides 296, only one of which is shown in FIG. 7, are secured to central pillars 314 and 316 fixedly mounted on and extending upwardly from the member 224 and 226 with an upstream end of the guides being further secured to the bridging member 312 adjacent the guides 294.

The guides 298, only one of which is shown in FIG. 7 are fixedly mounted on the pillar 316 and a next in line pillar 318 supported on the members 224 and 226 and the final pair of guides 300 are mounted between the pillar 318 and a next in line pillar 320 supported on the member 224 and 226, see FIGS. 7 and 8.

Viewing FIG. 7 it is evident that, when the infeed conveyor is in use, the chains 276 and 278 are constrained to follow a first inclined path, provided by the guides 290, a short horizontal path provided by the guides 292, a second inclined path, provided by the guides 294, an intermediate horizontal path, provided by the guides 296, a third inclined path provided by the guides 298 and a final horizontal path provided by the guides 300.

Between the downstream and upstream ends of the infeed conveyor there is a pair of chain guides 330 secured by straps 334 to the members 224 and 226, see FIGS. 7 and 8; thus, the chains 276 and 278 are supported in a lower run 332 of the conveyor 20.

The pallet slides 232 are supported on extensions of the "T" piece 3o8 and the pillar 314 and provide support for a leading end portion of pallets P conveyed by the elements 280 and 282 as aforesaid.

The pallet slides 234 are provided at a mid-section of the infeed conveyor and are fixedly mounted one on each side of the conveyor 20 on pillars 322 and 324 secured in turn to cross members 326 and 328 fixedly mounted on the central pillars 314 and 316 respectively, see FIG. 7. The slides 234 are arranged to support tile pallet T conveyed through the mid section of the infeed conveyor 20 by the drive elements 280 and 282 of the drive means for a purpose to be made clear hereinafter in reference to the racking assembly 22.

The Racking Assembly

The racking assembly 22, see FIGS. 9, 10 and 11, which is part of a combined racking and de-racking apparatus 34 as aforesaid, is provided with a fabricated metal frame structure which includes support for twin racking stations 340 and 342. The stations 340 and 342 are provided one on either side of the path 28 along which the tile trolleys 29 are conveyed seriatim. The infeed conveyor 20, when assembled in its operative position w.r.t. the racking assembly, is arranged so that its upstream end is under the racking station 340 and its downstream end is under the station 342 with the mid-section of the conveyor 20 located beneath rails 343 defining the path 28 for the tile trolleys 29 see FIG. 9.

The racking stations 340 and 342 have the same design and mode of operation and only the station 340 will be described in detail below.

The station 340 is provided with a rising conveyor 344 fixedly mounted on brackets 346 secured to four columns 348 arranged in an open box-like configuration, see FIGS. 9 and 10 with cross members 349 joining their upper ends 348a. The rising conveyor 344 is constituted by two opposed conveyor magazine 350 and 352. Each magazine is provided with a pair of endless chains 354 supported on sprockets 356 fixedly mounted on a shaft 358 at an upper end of the magazine and on sprockets 360 fixedly mounted on a shaft 362 at a lower end of the magazine, see FIGS. 9 and 10. Each shaft 358 and 362 is rotatably mounted in associated bearing brackets 364 and 366 secured to upper and lower end portions 268 and 370 respectively of the magazine see FIG. 13. The bearing brackets 366 are slotted, to facilitate the tensioning of the chains by devices 369 of conventional design, see FIGS. 12 and 13.

The shaft 358 of each magazine 350 and 352 is provided with an extension 374, see FIG. 12, on which is fixedly mounted a sprocket 376 arranged to be driven by an endless chain 378, as hereinafter described, to cause rotation of the shaft 358 and upward movement of the shelves 372.

The station 340 also comprises a racking device 380 see FIG. 9, whereby, when the tile plant is in use and tile pallets P, fed to the racking assembly 22 by the infeed conveyor 20, are arranged in a spaced stack in the rising conveyor 344, the pallets P are pushed out of the rising conveyor 344 into a tile rack 30 of a trolley 29. Each trolley has upright walls defining a number of racks 30 and each rack can accomodate four columns of tiles. The racking device 380 comprises a pusher arm 382 arranged on slides and connected to opposite ends of a chain 384. The chain 384, see FIGS. 9 and 11 is arranged on sprockets 386 and 388 rotatably mounted on brackets 390 supported by the cross members 349 of the racking assembly. A motor 392 is also mounted on the cross member 349, see FIG. 9 and 11 and the endless chain 384 is directed by intermediate sprockets 394 and 396 to pass around a drive sprocket 398 of the motor 392. Thus, when the plant is in use and the rising conveyor 344 is filled with pallets P carrying "green state" tiles T operation of the motor 392 is effective to cause movement of the chain 384 and the arm 382 whereby the pallets P are pushed into an aligned tile rack 30. The tile rack 30 is arranged to accomodate four pallets P across its width, see FIG. 9 and two columns of such pallets are pushed one after the other into the rack 30 by the pusher arm 382 of the station 340.

To this end the arm has limit switches associated therewith for controlling the motor 392 and the chain drive to the arm 382.

As will be appreciated from FIGS. 9, 10 and 11 the station 343 is almost a mirror image of the station 340 and comprises complementary parts with the same numbers as those described herein in reference to station 340.

Drive means 402 for the rising conveyor 344, the infeed conveyor 20 and the outfeed conveyor 18 will now be described in detail, see FIGS. 9, 10 and 11.

The drive means 402 is a comprehensive interconnected arrangement of motors, cluches and chains for achieving synchronous operation of the said units and comprises a main motor 404 supported on a carrier plate 406 provided on a floor mounted column 408, see FIG. 10. The column 408 is fixedly connected to a crosspiece 410 which is similar to the cross member 349 of the racker-deracker assembly, see FIGS. 10 and 11, and to a column 348 of the station 342 by an angle bracket 412.

The motor 404 is connected see FIG. 10, via a housing 413 and gear box 414 and a downwardly extending connecting rod 416, located in journal bearings 418 and 420 mounted on said column 408, to a bevel gear assembly 422. A shaft 424 connected to said assembly 422 is mounted in bearings 426 and 428 on said angle bracket 412.

At an end remote from said assembly 422 the shaft 424 provides support for a sprocket 427.

An endless chain 429 passes about the sprocket 427 and a drive sprocket 430 provided on an extension of the shaft 260 supported in the bearing 254a, see FIG. 8.

Thus, when the motor 404 is driven the infeed conveyor 20 is also driven through the aforesaid connections.

The chain 429 is tensioned by an adjustable sprocket mechanism indicated as 431 in FIGS. 7 and 8.

The drive between the outfeed conveyor 18 and the infeed conveyor 20 is achieved by an endless chain not shown which extends about a sprocket 434, fixedly mounted on an outward end portion 436 of the shaft 120 of the outfeed conveyor 18, see FIG. 6, and a sprocket 438 fixedly mounted on an outward end portion of the shaft 248, see FIG. 8.

The drive between the motor 404 and the rising conveyors 344 of the stations 340 and 342 comprises a shaft 450 connected to the gear box 414 via an intermediary bevel gear assembly 452 and a short shaft 454, see FIG. 11.

The shaft 450 is rotatably mounted in a series of bearings 456 carried by a support 458 secured to the cross piece 410 of the racker de-racker assembly, see FIG. 11. At an end remote from the motor 404 the shaft 450 carries a sprocket 460 connected by an an endless chain 462 to a sprocket 464 of a drive shaft 466. The drive shaft 466 is rotatably mounted in bearing blocks 468 and 470 carried by a plate 472 fixedly mounted on the cross member 349.

The drive shaft 466 extends through the bearing block 470 as shown in FIG. 11 and carries a sprocket 473 at its outer end, which sprocket 473 is engaged by the endless chain 378 associated with the drive sprocket 376 of the magazine 352, see FIGS. 10, 11 and 12. Idler sprockets 475 and 477 are provided, see FIG. 10, for guiding and tensioning the chain 378 of the magazine 352.

The block 470 also carries a plain gear 480 which meshes with a second plain gear 482 carried on a drive shaft 484 rotatably mounted in bearing blocks 486 and 487 carried by the platten 472.

The drive shaft 484 extends through the bearing block 486 as shown in FIG. 11 and carries a sprocket 488 at its outer end, which sprocket 488 is engaged by the endless chain 378 assoicated with the magazine 350, see FIGS. 10 and 11. Idler sprockets 490 and 492 are provided, see FIG. 10, for guiding and tensioning the chain 378 of the magazine 350. Thus, it will be appreciated, when the motor 404 is energised, the rising conveyor 344 will move in synchrony with the outfeed conveyor 18 and the infeed conveyor 20.

As can be seen in FIG. 11 the shaft 484 is connected by a sprag clutch mechanism 494, a sprocket 496 and an endless chain 498 to the sprocket 499 of a secondary motor 500 the purpose of which will become clear hereinafter.

The station 342 is provided with a drive mechanism for its rising conveyor which mechanism, see FIG. 10, is subtantially the same as that just described in connection with the station 340. The mechanism is connected to the shaft 450 by a chain 462a which engages a sprocket 460a carried by the shaft 450.

Racking Assembly—Operation

When the tile plant is in use pallets P carrying "green state" tiles T emerge from the tile making machine 16 and are fed seriatim towards an upstream end of the outfeed conveyor 18. At this point, see FIG. 3, abutments on the underside of the tile pallets P are engaged by the faces 188 of the associated drive dog 179. Thus, the tile pallets are conveyed along the slide members 84 and 94 towards the infeed conveyor 20. As the distance apart of successive pairs of drive dogs 179 of the outfeed conveyor 18 is slightly more than the length of the pallets P it follows that the pallets will be conveyed as aforesaid in a spaced relationship and with minimal increasedpeak speed.

The upstream end of the outfeed conveyor 18 is partially accommodated within the confines of the infeed conveyor 20 thereby facilitating the smooth transfer of pallets P from the slide members 84 and 94 to the pallet slides 232 where they are engaged by the elements 280 and 282 for conveyance towards the stations 340 and 342 of the racking assembly.

To achieve the smooth transfer, the elements 280 and 282 are gradually brought into a pallet engaging relationship at the downstream end of the infeed conveyor 20 in which relationship the elements 280 and 282 engage and support a rearward end of the pallets P. Thus the pallets move along the infeed conveyor 20 on a rising path but with each pallet being generally level as it passes up this path.

Viewing the upstream end of the infeed conveyor 20 it is evident that the chain guides 290. constrain the elements 280 and 282 carried by the chain 276 and 278 to follow paths which ensure the said engagement and smooth transfer of the pallets as the dogs 179 of the outfeed conveyor 18 are carried away from said paths and out of engagement with the pallets P by the effect of the sprockets.

Continued movement of the elements 280 and 282 brings the forward ends of successive pallets into engagement with the shelves or supports 372 of the continuously rising conveyor 344 of the station 340. The shelves 372 of the conveyor 344 are conveyed upwardly at this time by the effect of the motor 404 through an associated clutch mechanism 463 mounted on the shaft 466 see FIG. 11. The mechanism 463 engages the rising conveyor 344 of the station 340; however, at this time a corresponding clutch, associated with the rising conveyor of the station 342, is not engaged.

It will, therefore, be appreciated that, with a continuously rising conveyor and a continously running infeed conveyor, the peak speeds of the two items are considerably lower than those experienced with the the racking arrangements utilised hitherto since there is no "dead" time to recover due to the stop-start operation of such prior art arrangements. In addition, the smooth transfer of pallets and "green-state" tiles from the infeed conveyor 20 to the rising conveyor 344 greatly reduces the incidence of damaged tiles which was a superfluous feature of the prior art racking arrangements.

As the elements 280 and 282 approach the shelves 372 of the rising conveyor 344 they are caused to pass below the shelves by the effect of the chain guides 292, see FIG. 7.

In this manner thirty-three pallets P are positioned in the rising conveyor by the elements 280 and 282 to form a spaced stack. After the thirty-third pallet P has been engaged by the rising conveyor 344 of the station 340, because of the space between the two series of shelves 372, successive pallets P pass through the mid-portion of the infeed conveyor 20 towards the rising conveyor of the station 342.

At this time, as the pallets P leave the guides 84 and 94 of the outfeed conveyor 18 their forward ends move into engagement with the pallet slide 232 of the infeed conveyor.

In their passage through the mid-section of the infeed conveyor 20 the pallets P are supported on the pallet guides 234.

As the spaced stack of pallets P is completed at the station 340 the associated clutch mechanism 463 is disengaged and the clutch mechanism associated with the rising conveyor of station 342 is engaged; thus, as the motor 404 is driven continuously, while the plant is in use and tiles are fed by the outfeed conveyor 18 to the infeed conveyor 20, the rising conveyors 344 of the stations 340 and 342 will be moved alternatively to be filled with pallets P.

When, due to disengagement of the clutch mechanism 463, the rising conveyor 344 of the station 340 comes to rest with a spaced stack of pallets P supported on the shelves 372 thereof, the stack is too low for the pusher arm 382 to engage the stack and push the pallets into a tile rack 30.

In order to move the rising conveyor 344 of the station 340 to align the shelves 372 with associated shelves in the tile rack 30 the secondary motor 500 is energised and the shelves 372 are moved slowly into said alignment. The clutch 494 is a safety device which prevents the shelves 372 from rolling back out of said alighment. When the shelves 372 of the rising conveyor 344 of the station 340 are in alignment with the associated shelves in the tile rack 30, the motor 392 is energised to cause movement of the pusher arm 382 to the left, see FIG. 9 to push the stack of pallets P into the rack 30. The pusher arm 382 has two lengths of stroke and in pushing a first stack of pallets into an empty rack 30 the arm 382 pushes the stack of pallets to a position adjacent a central axis of the rack. As the stack approaches the central axis the movement of the pusher arm 382 is gradually reduced to avoid shock loads on the "green state" tiles carried by the pallets.

As the stack of spaced pallets P is being transferred into the rack 30 from the station 340 a next stack is being formed in the rising conveyor of the station 342 for subsequent transfer to an opposite side of the rack 30 by an associated pusher arm.

The pusher arm 382 of the station 340 is then returned to its start position, as shown in FIG. 9, and the motor 500 is again energised to reset the shelves of the rising conveyor to a start position.

From the above it will be obvious that successive spaced stacks of pallets P are formed in the stations 340 and 342 for transfer to the rack 30. The stroke of the pusher arms of the stations is chosen so that the stacks formed in the racks 30 are spaced apart to ensure the "green state" tiles carried by the pallets are undamaged by contact with each other and that even curing of tile edge portions is obtained.

In order to ensure that the operation of the racking assembly is effected smoothly appropriate sensors and limit switches are used where necessary.

As the racks 30 are filled with tile pallets P, their associated trolleys are moved forwardly along the path 28 until a trolley 29 is fully loaded with tiles. The trolley then follows a circuitous path through the curing chamber 32 as described above and eventually returns to the de-racking assembly 36 of the racking-deracking apparatus 34.

The Deracking Assembly

The deracking assembly 36, see FIGS. 11, 15, and 6, which is part of a combined racking and deracking apparatus 34 as aforesaid, is provided with a fabricated metal frame structure 560 which includes support for deracking apparatus 562 on the upstream side of the path 28 along which the tile trolleys 29 are conveyed seriatim. The outfeed conveyor 40, when assembled in its operative position with respect to the deracking apparatus 562 is arranged so that its upstream end is under the deracking apparatus 562 and its downstream end is adjacent to the depalleting station 7 see FIG. 1.

The apparatus 562 is provided with a descending conveyor 564 mounted on rollers 565 which are received in guide ways 567 of upper support brackets 565 and by slide elements 565a which engage with guides 567a of a lower support bracket 566a see FIG. 16. The brackets 566 and 566a are secured to four columns 568 which are arranged in an open box-like configuration see FIGS. 15 and 16 with cross members 570 joining their upper ends 572. The descending conveyor 564 is constituted by two opposed conveyor magazines 574 and 576. Each magazine is provided with a pair of endless chains 578 supported on sprockets 580 fixedly mounted on a shaft 582 at an upper end of the magazine and on sprockets 584 fixedly mounted on a shaft 585 at a lower end of the magazine, see FIGS. 15 and 16. Each shaft 582 and 585 is rotatably mounted in associated bearing brackets 586 and 588 secured to upper and lower portions 590 and 592 respectively of the magazine. The shafts 582 are also supported in elements 583, only one of which is shown in FIG. 16, which elements 583 extend between the upper ends 572 of the columns 568.

The pairs of endless chains 578 of each magazine provide support for shelves 594 arranged in aligned pairs for supporting tile pallets P fed to the magazine and conveyed downwardly by the descending conveyor 564.

The shaft 582 of each magazine 574 and 576 is provided with an extension not shown on which is fixedly mounted a sprocket, also not shown, arranged to be driven by an endless chain 600, as hereinafter described to cause rotation of the shaft 582 and downward movement of the shelves 594.

The assembly 36 also comprises a deracking device 602 supported on four columns 568a arranged in an open box-tile configuration, see FIG. 15; the cross members 570, joining the columns 568, also extending over the path 28 to be joined to upper ends 572a of the columns 568a. The deracking device 602 is effective when the tile plant is in use and tile trolleys 29 are fed to the deracking assembly 36 along the path 28, to push the pallets P out of the rack 30 into the shelves 594 of the descending conveyor 564 as hereinafter described.

The deracking device 602 comprises a pusher arm 604 arranged on slides and connected to opposite ends of a chain 606. The chain 606, see FIGS. 11, 15 and 16 is arranged on sprockets 608 and 610 rotatably mounted on brackets 612 supported by the cross members 570 of the deracking assembly. A motor 614 is also mounted on the cross member 570, see FIGS. 11 and 15 and the chain 606 is directed by intermediate sprockets 616 and 618 to pass around a drive sprocket 620 of the motor 614. Thus, when the plant is in use and the decending conveyor 564 is to be filled with pallets P tiles T, operation of the motor 614 is effective to cause movement of chain 606 and the arm 604 whereby the pallets P are pushed out of an aligned tile rack 30 onto the descending conveyors 564. The tile rack 30 is arranged to accommodate four pallets P across its width as described above, and one column of such pallets and tiles is pushed out of the rack 30 onto the shelves 594 at one time. To this end the arm 604 has limit switches 615 associated therewith for controlling the motor 614 and the chain drive to the arm 604 so that the pusher arm 604 is movable to four extened positions for pushing four columns of pallets sequentially onto the shelves 594.

Drive means for the descending conveyor 564 and the outfeed conveyor 40 will now be described in detail, see FIGS. 11, 15 and 16.

The drive means is a comprehensive interconnected arrangement of motor and chains for achieving synchronous operation of the said units and comprises a main motor 622 supported on a carrier plate 624 provided on a floor mounted column 626, see FIGS. 15 and 16. The column 626 is fixedly connected to a crosspiece 628 of the racker-deracker assembly, see FIGS. 15 and 16 and to one of the columns 568 of the station 562 by an angle bracket 630.

The motor 622 is connected via a gear box 634 and a downwardly extending connecting rod 636, see FIGS. 15 and 16, located in journal bearings 638 and 640 mounted on said column 626, to a bevel gear assembly 642. A shaft 644 connected to said assembly 642 is mounted in bearings 646 and 648 on said angle bracket 630.

At an end remote from said assembly 642 the shaft 644 provides support for a sprocket 650.

An endless chain 652 passes about the sprocket 650 and a drive sprocket 685 provided on an extension of the shaft 784 supported in the bearing block 782, see FIG. 17. Thus, when the motor 620 is driven the outfeed conveyor 40 is also driven through the aforesaid connections.

The chain 652 is tensioned by an adjustable sprocket mechanism indicated as 654 in FIG. 16.

The drive between the motor 622 and the descending conveyor 564 comprises a shaft 656 connected to the gear box 634 via an intermediary bevel gear assembly 658 and a short shaft 660, see FIGS. 11 and 15.

The shaft 656 is rotatably mounted in a pair of bearings 662 carried by a support 664 secured to the cross member 570 of the racker-deracker assembly, as shown in FIGS. 11 and 15. At an end remote from the assembly 658 the shaft 656 carries a sprocket 666 connected by an endless chain 668 to a sprocket 670 of a drive shaft 672. The drive shaft 672 is rotatably mounted in bearing blocks 674 and 676 carried by a plate 678 fixedly mounted mounted on the cross member 570.

The drive shaft 672 extends through the bearing block 676 as shown in FIG. 11, and carries a sprocket 680 at its outer end, which sprocket 680 is engaged by an endless chain 600 associated with the magazine 576. Idler sprockets 682 and 684 are provided, see FIG. 16, for guiding and tensioning the chain 600 of the magazine 576.

The block 676 also carries a plain gear 686 which meshes with a second plain gear 688 carried on a drive shaft 690 rotatably mounted in an extension of the bearing block 676, see FIG. 11.

The drive shaft 690 extends through the bearing block 676 as shown in FIGS. 11 and 16 and carries a sprocket 692 at its outer end, which sprocket 692 is engaged by the endless chain 600 associated with the magazine 574. Idler sprocket 694 and 696 are provided, see FIG. 16, for guiding and tensioning the chain 600 of the magazine 574. Thus it will be appreciated, when the motor 622 is energised, the descending conveyor 564 will move in synchrony with the outfeed conveyor 40.

The Outfeed Conveyor of the Deracking Assembly

The outfeed conveyor 40, as aforesaid, is effective, when the assembly 22 is in use, to remove tile pallets P and tiles T carried thereby from the descending conveyor 564 and 560 transfer them to the depalleting station 8.

Referring now to FIGS. 17, 18 and 19, the outfeed conveyor 40 comprises a main support frame 720 having legs 722 and 724 at upstream and downstream end portions 726 and 728 thereof respectively. The legs 722 and 724 are supported on floor mounted brackets 730 and 732 respectively. An adjustment means 734, whereby the trim of the frame 720 may be maintained, is provided on the bracket 732, see FIG. 17. The frame 720 also comprises two spaced bridging members 736 and 737 which extend between upper end portion of the legs 722 and 724 and are secured thereto by bolts 738 (see FIG. 18). The frame 720 further comprises two pillars 740 and 742 at the upstream and downstream end portions 726 and 728 of the conveyor 40 respectively. The pillars are located between the members 736 and 737 and extend upwardly therefrom, the pillar 740 being longer than the pillar 742. The pillars 740, 742 provide support for upper and lower pairs of guide members 744, 746 and 748 750 and, because of the difference in height of the pillars, the guide members 744, 746, 748 and 750 slope downwardly from the upstream towards the downstream end of the outfeed conveyor 40, as shown in FIG. 17.

The guide members 744 and 746 are of inverted "L" cross-section, see FIGS. 18 and 19 and provide support along their whole lengths for hard metal bearing strips 752 and 754 respectively. The guides 744 and 746 also provide support along approximately half of their length for pallet slides 756 and 758 respectively which slides extend from the upstream end of the conveyor 40 towards a mid-portion thereof.

The guide members 748 and 750 are also of inverted "L" cross-section, and provide support along their whole lengths for chain guides 760 and 762 respectively the purpose of which will become clear hereinafter.

As will be appreciated from FIGS. 18 and 19 the guide members are spaced from the pillars 740 and 742 by appropriate spacing means and mid-way between the pillars 740 and 742 a spacing and stiffening members 764 is located between the guides.

The conveyor 40 provides support for drive means 766 for engaging pallets P in the descending conveyor 564 and moving them out of the deracking assembly 36.

The drive means includes a drive shaft 770, see FIGS. 17 and 18 rotatably mounted in bearing blocks 772 and 774 adjustably secured on a "Y" shaped bracket 776 which is in turn fixedly mounted on the leg 724 at the downstream end of the conveyor 40.

Fixedly mounted on the drive shaft 770 for rotation therewith are a pair of sprockets 778 and 780 which are arranged in substantial alignment with the chain guide 760 and 762 respectively, see FIG. 18.

At the upstream end of the conveyor 40 the drive means comprises aligned lower bearing blocks 782 only one being shown in FIG. 17 which blocks 782 are secured between the pillar 740 and the members 736, and 737 and which blocks 782 provide support for a rotatable shaft 784 which carries chain sprockets 786 arranged to be in line with the sprockets 778 and 780 respectively at the downstream end of the conveyor 40.

The drive means also comprises an upper bearing block 790 secured to an upper end 792 of the pillar 740 which block 790 provides support for a rotatable shaft 794 which carries chain sprockets 796 and 798 arranged in line with the sprocket 778, 786 and 780, 788 respectively.

Endless chains 800 and 802 are supported by the sprockets 778, 786 and 796 and the sprockets 780, 788 and 798 respectively. In an upper run the chains 800 and 802 pass through the guides 760 and 762 respectively, while in a lower run the chains 800 and 802 are supported on elongate friction pads 804 and 806 respectively, which pads 804 and 806 are secured to upper walls 808 and 810 respectively of the members 736 and 737.

The endless chains 800 and 802 provide support for a series of drive dogs 812 and 814 respectivey which, when the plant is in use and the descending conveyor 564 of the deracking assembly 36 is in motion, engage trailing ends of the pallets P to push them out of the conveyor 564 onto the pallets slides 756 and 758.

The drive dogs 812 and 814 each comprise a support bracket 816 by which they are secured to their respective chains, the support bracket 816 in turn providing pivotal support for a dog member 818 comprising a pallet engaging face 820 and a pallet support face 821. Each bracket 816 also provides support for a cam roll 822.

At the upstream end of the conveyor 40 the rolls 822 of the dogs 812 and 814 are guided by elements 824 and 826 fixedly secured to the bearing block 790 see FIG. 17.

When the tile plant is in use and pallets P are being conveyed from the deracking assembly, the pallets will be driven down the pallet slides 756 and 758, by engagement of the faces 820 with the abutments provided at forward end portions of the pallets P, until the pallets engage the cords of the cord conveyor in the second run 44 of the assembly 10. During this movement the leading bottom edge portions of the pallet P are supported by the support faces 821 of the dogs 812 and 814.

In the upper run of the chains 800 and 802, the rolls 822 of the drive dogs 812 and 814 engage the bearing strips 752 and 754, see FIG. 19.

Deracking Assembly—Operation

When the tile plant is in use tiles T, made by the machine 16, are conveyed on their pallets P to the racking assembly 22 and transferred into racks 30 as described above in such a manner that columns of spaced apart pallets P and tiles T thirty-three deep are formed in spaced relationship widthwise of each rack, there being four such columns across each rack 30. Each trolley 29 has five racks 30 lengthwise thereof as shown in FIG. 1 and thus each rack will hold 660 tiles T on their associated pallets P.

As described above, the trolleys 29 pass through the curing chamber 6 and when the curing cycle is completed, the trolleys 29 are fed seriatim along the rails 28 to an upstream side of the deracking apparatus. In this position the racks 30 are sequentially positioned to align the columns of pallets P with the shelves 594 of the descending conveyor 564.

At this time a motor 700 is energised, which motor 700 is mounted on a support bracket 702 secured to the upper ends 572a of the front columns 568, see FIGS. 11 and 15. Energisation of the motor 700 causes part rotation of a cam plate 706 and movement of a connecting rod 708 in an inward stroke to move the descending conveyor 564 on the rolls 565 inwardly by approximately 100 mm towards the rack 30 for a purpose to be described hereinafter.

With the conveyor 564 adjacent the rack 30 the motor 614 is operated to cause the pusher arm 604 to be moved by the chain 606 in the direction of the arrow 710, see FIG. 15.

The pusher arm 604 engages the pallets P in an adjacent column of such pallets and pushes them into shunt relationship with the next adjacent column whereby the four columns of pallets, widthwise of the rack 30, are moved towards the shelves 94 of the descending conveyor 564. It will be appreciated that the sequential contact of adjacent pallets and tiles is not harmful at this stage because the tiles are now cured and hard. This is in contrast to the racking assembly where contact between adjacent pallets is avoided. The pusher arm 604 has associated therewith appropriate stop devices whereby, when a column of pallets P, remote from the arm 604, is wholly accommodated on the shelves 594, a first stop device is operated and the motor 614 is deenergised. Thus, a spaced stack of pallets and tiles is formed in the conveyor 564 for transfer along the outfeed conveyor 40.

However, before the transfer operation is commenced the motor 700 is energised to move the cam plate 706 and the connecting rod 708 in an outward stroke to move the descending conveyor, on its rolls 565, outwardly by approximately 100 mm in order to separate the conveyor 564 from the rack 30.

To facilitate this movement, a piston and cylinder arrangement may be provided to assist the movement of the conveyor 564 with respect to the rack 30, the piston being actuated in synchronisation with the cam plate 706. Thus, the pallets and tiles in a first column, now accommodated in the descending conveyor, are separated from the next column in the rack 30 whereby, when the descending conveyor is operated, there is no contact between the pallets and tiles in the said columns and the risk of jamming of the tiles on the pallets is avoided.

After outward movement of the conveyor 564 as aforesaid the motor 622 is energised and, through the connections described herein, the descending conveyor 564 and the outfeed conveyor 40 are operated continuously whereby the shelves 594 begin to move downwardly in synchronism with the passage of the dogs 812 and 814 past an upstream end of the shelves 594. The leading ends of the pallets P are engaged by the faces 820 and supported by the faces 821 of associated dogs 812 and 814 as aforesaid and the pallets and their tiles are conveyed seriatim out of the descending conveyor 564.

Continued movement of the dogs 812 and 814 cause the pallets to be moved on to the cords of the cord conveyor 42 and towards the depalleting station 8 as aforesaid.

When the column of pallets in the descending conveyor is depleted the motor 622 is stopped bringing the conveyors 564 and 40 to rest. The motor 700 is once again energised to cause inward movement of the conveyor 564 as aforesaid and the motor 614 is energised to cause the next column of pallets and tiles to be pushed into the shelves 594 of the descending conveyor.

It will be readily appreciated that continuous operation of the descending conveyor 564, in conjunction with the outfeed conveyor 40, during the removal of the pallets and cured tiles from the spaces stack, will result in a smooth operation at reduced peak speeds compared to prior art arrangements. Thus cured tiles, deracked in the arranged described above will be subjected to less shock loads with the advantageous result that damage to the freshly cured tiles is drastically reduced.

After deracking in the assembly 36 the pallets P are transferred from outfeed conveyor 40 to cord conveyor 42 as described above. The pallets pass through the brushing station 46 to the depalleting device 48 and, as described above, the separated tiles are thereafter fed via a conveyor 45 to a collation and packing station 9 while the now empty pallets are transferred to conveyor 49. As mentioned above, the depalleting device 48 is of known type. The collation and packaging station 9 may also be of known type or may be as described in our co-pending application Ser. No. 751,911 entitled "Improvements in collation assemblies".

In their passage into the racks 30 of the trolleys 29 and consequently through the curing chamber 6 before they are returned to the cord conveyor 42 of the second conveyor run 44, the pallets P are maintained in a common alignment, i.e. the pallets are not rotated about a vertical axis. Thus, it will be appreciated that the dispositions of pallets P in the first run of the conveyor assembly of the tile plant are opposite to those of the pallets P in the second run of the plant when related to the direction of travel of the pallets along the respective runs of the assembly 10. This has been described briefly above.

At a downstream end of the second run, the conveyor assembly 49 is provided as aforesaid whereby, when the plant is in use, pallets P are fed via a suitable transfer means to the upstream end of the conveyor assembly 12. The conveyor assembly 12 is provided as aforesaid whereby, when the plant is in use, pallets P are fed one at a time in spaced relationship toward the tile making machine 16, see FIGS. 1, 20 and 21.

As has been described above, the speeds of operation of the various conveyors and racking and deracking assemblies of the tile making plant are synchronised. This is achieved in some cases by driving one or more parts of the apparatus from a single motor. It will be appreciated that the above described arrangement is not limiting and various modifications may be made.

For example, the arrangement of the various stations of the tile making plant may be varied to suit the particular site on which the plant is located. In this respect, it will be appreciated that the diagram of FIG. 1 is purely schematic and is not intended to depict the relative positions of the various stations. The relative lengths and directions of the various conveyors may be varied.

Still further, the pusher arms described above may be movable to a further "parked" position in which the pusher arms are clear of the assembly with which they are associated. This may facilitate maintenance of the pusher arms and associated apparatus.

It will be appreciated that the sequence of operations described above is controlled and necessary switching on and off of the various motors involved is controlled by limit switches and sensors. The necessary control circuits and monitoring of these devices may be achieved by micro-processors.

Reference is made to our co-pending applications Ser. Nos. 751,911 and 751,984 in which we have claimed other aspects of the tile plant described above.

What is claimed is:

1. Apparatus for unloading a plurality of building components on pallets from vertically spaced shelves in racks onto an outfeed conveyor means, and for placing said pallets and the building components thereon on an outfeed conveyor means, the apparatus comprising a descending conveyor means comprising a pair of endless conveyors having a plurality of pairs of supports thereon forming opposing shelves, the pairs of supports being spaced apart by distances which are equal to the spaces between the shelves in the racks, each pair of supports being adapted to engage and support opposed edge portions of a pallets, rail means running alongside the descending conveyor means for supporting said racks, pusher means for pushing a column of pallets and building components carried thereon from the shelves in the racks onto the supports of the descending conveyor means, reciprocating means for moving the descending conveyor means between a first position in which the supports of the descending conveyor means abut the shelves in the racks and a second position in which the supports of the descending conveyor means are spaced apart from the shelves of the racks, and means, operable after said descending conveyor has moved from its first position to its second position, for continuously driving the descending conveyor means to lower the pairs of supports in timed relation to the longitudinal movement of the outfeed conveyor means, said opposed shelves of the unloading apparatus being horizontally spaced apart to enable the outfeed conveyor means to be located therebetween so as to receive the pallets when the pallets are moved downwardly by the descending conveyor means, said apparatus being operable to transfer a complete column of pallets and building components from the supports of the unloading apparatus to the outfeed conveyor means in spaced relationship.

2. Apparatus as claimed in claim 1 in which the descending conveyor means is mounted on a movable carriage and the reciprocating means comprises cam means.

3. Apparatus as claimed in claim 2 in which the reciprocating means further comprises a piston and cylinder arrangement.

4. Apparatus as claimed in claim 2 in which the cam means is driven by a motor in timed relation to downward movement of the descending conveyor and the outfeed conveyor, the arrangement being such that the descending conveyor means is moved from said first to said second position before the descending conveyor means is driven to lower the supports.

5. Apparatus as claimed in claim 1 in which the pusher means is movable from a rest position to a plurality of extended positions for pushing one of a plurality of columns of pallets from the shelves of a rack on to the supports.

6. Apparatus as claimed in claim 5 in which the pusher means is movable to four extended positions, for pushing four columns of pallets sequentially on to the supports.

* * * * *